Sept. 11, 1923.
R. A. HARTMANN
UNIVERSAL JOINT
Original Filed Feb. 20, 1922
1,467,380
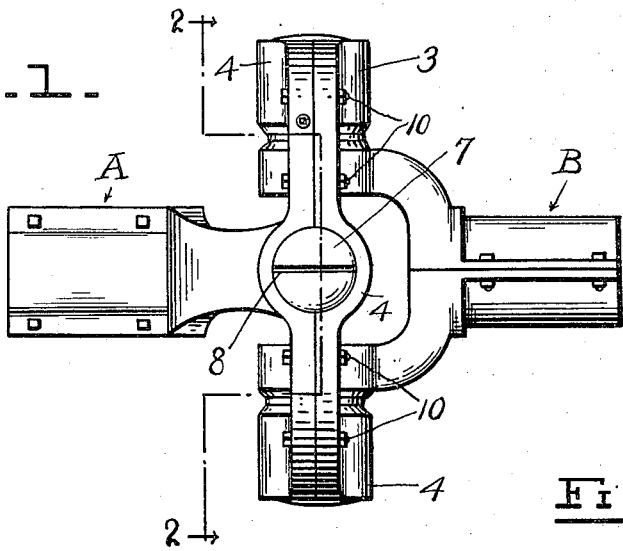
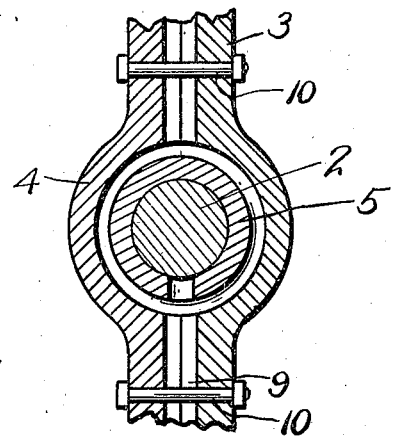
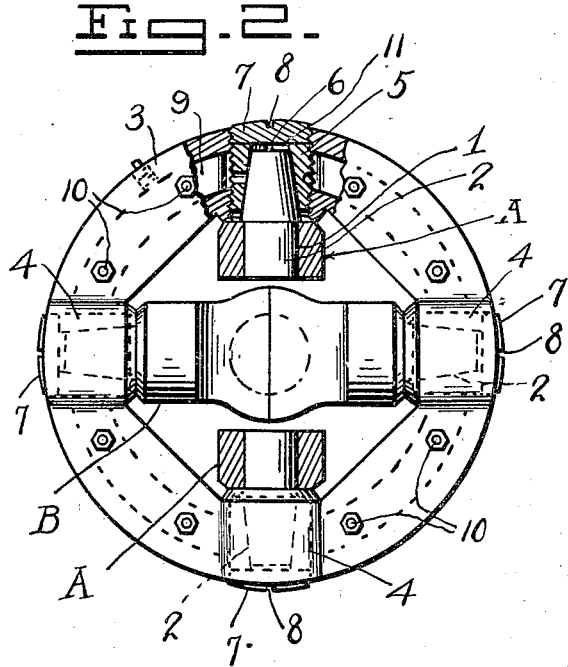
Inventor
Richard A. Hartmann
By L. B. James
Attorney Patented Sept. 11, 1923.

1,467,380

UNITED STATES PATENT OFFICE.

RICHARD A. HARTMANN, OF HARTFORD, CONNECTICUT, ASSIGNOR TO THE HARTMANN MANUFACTURING CO., OF HARTFORD, CONNECTICUT.

UNIVERSAL JOINT.

Application filed February 20, 1922, Serial No. 537,980. Renewed May 9, 1923.

*To all whom it may concern:*

Be it known that I, RICHARD A. HARTMANN, a citizen of the United States, residing at Hartford, in the county of Hartford and State of Connecticut, have invented new and useful Improvements in Universal Joints, of which the following is a specification.

This invention relates to a universal joint of the type where a ring member is provided for connecting the two members together, the general object of the invention being the provision of adjustable bearings for connecting the ring member to the studs which are carried by the members which are to be connected together.

Another object of the invention is to provide a screw threaded cap for holding each bearing in its adjusted position and also for providing a lubricant container.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Figure 2 is a section on line 2—2 of Figure 1 with parts broken away.

Figures 3 and 4 are detail views.

In these views A and B indicate the members which are to be connected together, each member having a forked end, each prong of which is provided with an opening 1 to receive a stud 2 which is preferably welded in place. The outer end of said stud is tapered, as shown. The ring member 3 is provided with four sockets 4 for receiving the projecting ends of the studs. The inner wall of each socket is screw threaded to receive a screw threaded bearing or bushing 5. The bore of this bushing is tapered to engage the tapered part of the stud. Thus by adjusting the bushing in the screw threaded socket wear between the bushing and stud may be taken up. Each bushing is provided with a slot 6 at its outer end for receiving a screw driver or the like so that it can be adjusted in the socket.

Each bushing is held in its adjusted position by means of a screw threaded cap or follower 7 which engages the outer end of the screw threaded socket. The inner face of this cap will engage the outer end of the bushing and thus hold the same against outward movement, this cap acting as a lock nut. Each cap is provided with a slot 8 so that it can be adjusted by a screw driver or the like. The ring member is formed with an interior chamber 9 for receiving lubricant and this chamber is in communication with the bore of each bushing by ports and passages so that the studs will be lubricated. The caps 7 act to retain this lubricant in the sockets.

The ring member is formed of two halves which are held together by the screws 10.

The two halves are clamped together with a thin packing between them and then the sockets are bored and threaded. This will make the sockets under size so that when the bearings and plugs are in place and the screws or bolts 10 tightened, said bearings and plugs will be clamped in place.

From the above it will be seen that the bushings can be adjusted in relation to the tapered parts of the studs so as to take up wear and that the bushings are held in adjusted positions by the caps, said caps also acting to retain the lubricant in the sockets. The parts can be adjusted by means of a screw driver or the like so that a special tool is not necessary.

A grease pocket 11 is formed between the end of each stud and the cap 7.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A universal joint of the class described comprising a pair of members, tapered studs carried thereby, a ring member having sockets to receive the tapered parts of the studs and also having oil passages connecting said sockets, a tapered bushing screw threaded in each socket for engaging the studs and having oil receiving openings intermediate their ends, means for locking the bushings in place, such means consisting of a screw threaded cap fitting in the outer end of each socket.

2. A universal joint of the class described comprising a pair of members, tapered studs carried thereby, a ring member having sockets for receiving the studs, the walls of each socket being screw threaded, a screw threaded bushing engaging each socket and each bushing having a tapered bore for receiving the tapered part of the stud, a screw cap fitting in the end of each socket for holding the bushing in adjusted position and a lubricant chamber in the ring member in communication with the bores of the bushings, said lubricant chamber being annular in form at each socket whereby to entirely surround each bushing and afford communication between the portions of the chamber at opposite sides of said bushing.

3. In a universal joint, a ring member formed of two halves, threaded sockets in said ring member formed by clamping the two halves together with a thin packing between them and then boring and threading the sockets, a bushing in each socket and a screw cap in each socket for holding the bushing in place and means for holding the two halves of the ring member together with the walls of the sockets clamping the bearings and caps in place.

4. A universal joint of the class described comprising a pair of members, tapered studs carried thereby, a ring member having sockets for receiving the studs, the walls of each socket being screw threaded, a screw threaded bushing engaging each socket and each bushing having a tapered bore for receiving the tapered part of the stud, a screw cap fitting in the end of each socket for holding the bushing in adjusted position, each cap entirely closing the outer end of the opening in the bushing and being positioned in spaced relation to the outer end of the respective stud to provide an oil receiving chamber, and a lubricant chamber in the ring member in communication with the bores of the bushings, said lubricant chamber being annular in form at each bushing to entirely surround the bushing in spaced relation thereto, the annular portions of the lubricant chamber being in communication one with the other, each bushing having an oil passage extending laterally therethrough intermediate its ends whereby oil may enter the bushing and work up into said oil chamber to maintain the same filled.

In testimony whereof I affix my signature.

RICHARD A. HARTMANN.